Aug. 24, 1954
L. BERTELE
2,687,064
THREE-COMPONENT PHOTOGRAPHIC OBJECTIVE
FORMED OF SIX-LENS ELEMENTS
Filed Jan. 5, 1953
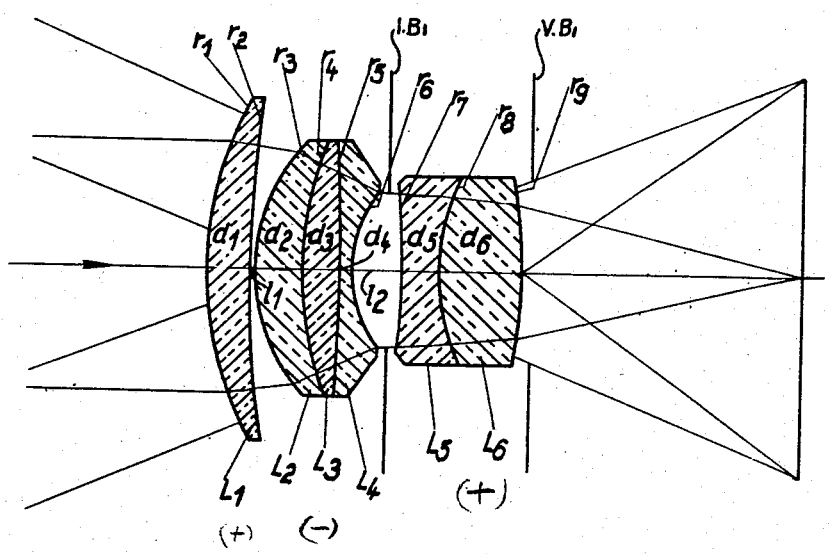
Inventor:
Ludwig Bertele Patented Aug. 24, 1954

2,687,064

UNITED STATES PATENT OFFICE 2,687,064

THREE-COMPONENT PHOTOGRAPHIC OBJECTIVE FORMED OF SIX-LENS ELEMENTS

Ludwig Bertele, Heerbrugg, Switzerland

Application January 5, 1953, Serial No. 329,681

Claims priority, application Germany January 12, 1952

1 Claim. (Cl. 88—57)

The subject matter of the present invention is an improvement of an optical objective disclosed in my prior patent specification Serial Number 181,847, filed August 28, 1950, now Patent No. 2,663,221, dated December 22, 1953. In the said prior specification I have described and claimed an objective made up of six lenses grouped into three components separated by air spaces of which the first lens counting from the object side is a converging lens constituting the first component, the second, third and fourth lenses constitute the second component which is of meniscus form convex towards the object, and the fifth and sixth lenses are of negative and positive power respectively and constitute the third component, the characteristic feature being that the difference between the refractive indices for the $d$-line of the fifth and sixth lenses exceeds 0.165 and that the radii of curvature of the adjacent surfaces of the said lenses are greater than 38% and less than 50% of the total focal length of the objective. The iris diaphragm is located between the said second and third components.

If such an objective is mounted in a camera, there results, as is known, the advantage that the sector shutter can be mounted directly behind the last lens surface facing the image and can, therefore, remain in a fixed position on the camera also with interchangeability of objectives. Undoubtedly the best position of the shutter is always in the vicinity of the iris diaphragm, since only in this position is the entire image field optimally illuminated per unit time. With an objective having the most favorable position of the iris diaphragm between the lenses, a displacement of the shutter immediately behind the last lens surface will result in a deterioration in the light distribution between image center and image periphery with the very short periods of exposure. However, if the distance between the plane of the iris diaphragm and the plane of the shutter is limited to a minimum, as is possible with objectives according to my above named prior patent specification, then still no noticeable deterioration of the illumination of the image field occurs. Investigations have shown, that this is possible, if in accordance with the present invention the said third component following the said iris diaphragm is formed as a meniscus bent towards the image, and the axial thickness of which is selected smaller than 0.280 f, whereby f indicates the focal length of the objective. To be sure a thinner rear element produces an increase of the pincushion distortion, however, this can again be reduced to a tolerable degree by displacing the cemented surface located in the last lens component in the direction towards the image.

In the accompanying drawing an exemplary embodiment of an objective according to the invention is represented, with the shutter behind the objective, particulars being given in the table set out hereinafter.

In the following example:

$r$ is the radii of curvature
$d$ the lens thicknesses
$l$ the air spaces
$n$ the refractive indices
$V$ the Abee number
I. B*f* is the iris diaphragm and
V. B*f* is the shutter.

*Example*

Focal length f=100 mm.
Relative aperture 1:2
Image angle ca. 50°

|    |                    |             | $n_d$  | V    |
|----|--------------------|-------------|--------|------|
| L₁ | $r_1=+\ 70.57$     | $d_1=\ 8.58$ | 1.6911 | 54.8 |
|    | $r_2=+240.32$      | $l_1=\ 0.38$ |        |      |
| L₂ | $r_3=+\ 36.81$     | $d_2=10.11$ | 1.6911 | 54.8 |
|    | $r_4=+\ 74.38$     |             |        |      |
| L₃ | $r_5=-348.90$      | $d_3=\ 7.44$ | 1.4800 | 70.0 |
| L₄ | $r_6=+\ 25.22$     | $d_4=\ 2.29$ | 1.6810 | 32.0 |
|    | $r_7=-144.95$      | $l_2=\ 9.73$ |        |      |
| L₅ | $r_8=+\ 45.78$     | $d_5=\ 7.63$ | 1.5000 | 56.5 |
| L₆ | $r_9=-\ 82.12$     | $d_6=17.17$ | 1.7170 | 47.9 |

I claim:

A photographic objective made up of six lenses grouped into three components separated by air spaces of which the first lens counting from the object side is a converging lens constituting the first component, the second, third and fourth lenses constitute the second component which is of meniscus form convex towards the object, and the fifth and sixth lenses are of negative and positive power respectively and constitute the third component, and an iris diaphragm between the fourth and fifth lenses, the difference between the refractive indices for the $d$-line of the fifth and sixth lenses exceeding 0.165 and the radii of curvature of the adjacent surfaces of the said lenses being greater than 38% and less than 50% of the total focal length of the objective, and the said third component following said iris diaphragm being a meniscus bent towards the image, the axial thickness of which being less than 0.280 f, whereby f indicates the said total focal length of the objective.

References Cited in the file of this patent

UNITED STATES PATENTS

| Number | Name | Date |
|---|---|---|
| 1,998,704 | Bertele | Apr. 23, 1935 |
| 2,029,806 | Bertele | Feb. 4, 1936 |
| 2,124,356 | Rayton | July 19, 1938 |
| 2,562,012 | Bertele | July 24, 1951 |

FOREIGN PATENTS

| Number | Country | Date |
|---|---|---|
| 481,561 | Germany | Aug. 24, 1929 |